April 18, 1933.   G. C. ROYSE   1,904,296
ADJUSTABLE WASHER
Filed Dec. 31, 1928
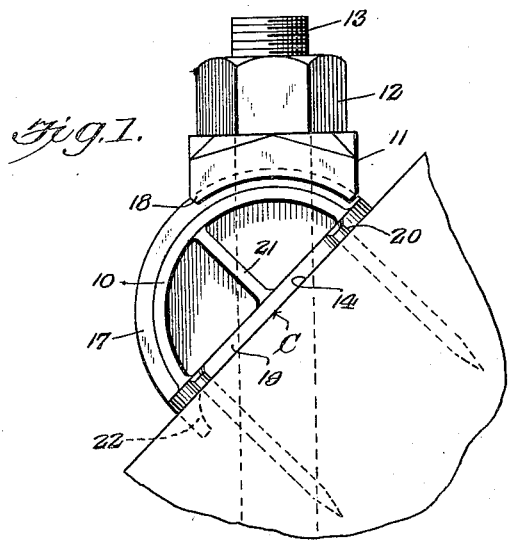
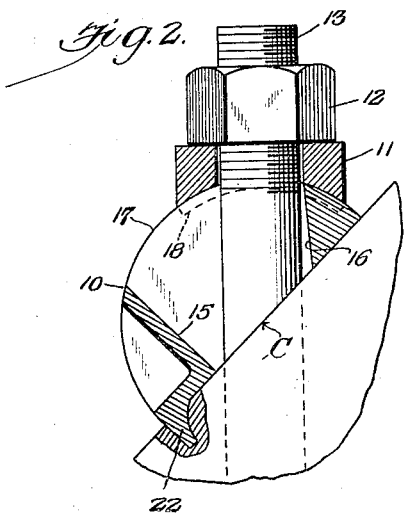
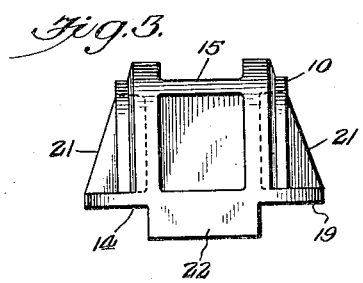
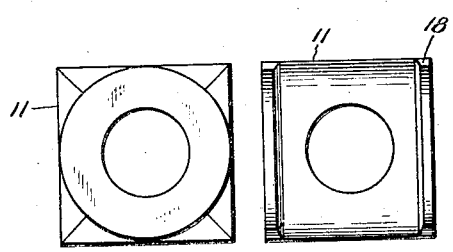
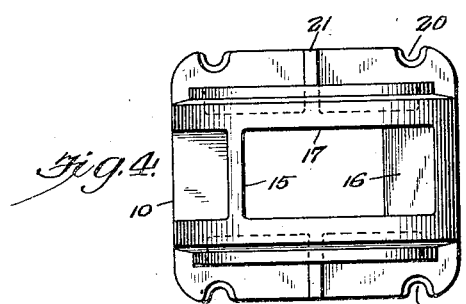
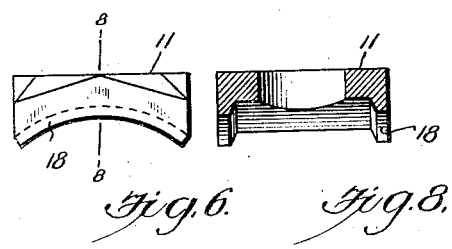
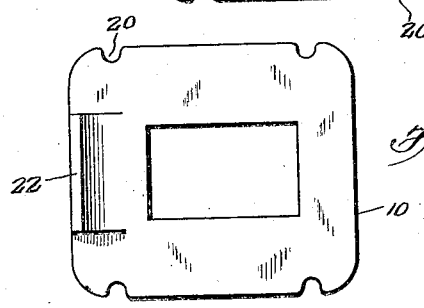
Inventor
G. C. Royse,
By
his Attorneys Patented Apr. 18, 1933

1,904,296

UNITED STATES PATENT OFFICE

GROVER C. ROYSE, OF SACRAMENTO, CALIFORNIA

ADJUSTABLE WASHER

Application filed December 31, 1928. Serial No. 329,402.

This invention relates to improvements in adjustable washers adapted to be placed under the heads or nuts of bolts, the construction of the washer being such that it may be readily used where the surface on which the washer rests is inclined at an angle to the bolt, other than a right angle, as in the case of inclined timbers, trusses or similar angular work. The present washer provides that at whatever angle in relation to the bolts the base of the washer may be set, nevertheless, the bolt can extend through the washer and the seat for the bolt head or nut will adjust itself so as to permit the head or nut to bear fairly on the washer.

One object of the present invention is to provide an adjustable washer wherein strains imposed thereon will be symmetrically or evenly distributed over the face of the washer which engages against the truss or other member which is being secured by the bolt.

Another object is the provision of means for temporarily securing the washer in place while the bolt is being put in place.

With these and other objects in view the present invention consists of certain novel details of construction, and combinations and arrangements of parts, all as will be hereinafter more fully described, and the novel features thereof particularly pointed out in the appended claims.

In the accompanying drawing,

Figure 1 is a side elevation of the present washer applied to the end of a bolt.

Fig. 2 is a sectional view through the washer.

Fig. 3 is an end elevation of the base piece of the washer.

Fig. 4 is a top plan view of said base piece.

Fig. 5 is a top plan view of the seating member of the washer.

Fig. 6 is an elevational view of said member.

Fig. 7 is a bottom view of said member.

Fig. 8 is a sectional view on the line 8—8 of Fig. 6.

Fig. 9 is a top plan view of the bottom face of the base piece.

In carrying out the present invention it is the primary object to so construct or arrange the washer that regardless of the angle that exists between the base piece thereof and the rod nevertheless the point at which the load is imposed upon the washer will be located centrally of the base piece. This is preferably accomplished by having the base piece 10 so formed that the seating member 11 for the nut 12 or other enlargement on the bolt 13 may be moved about a center C which is located substantially in the same plane as the face 14 of the base piece which rests on the face of the timber or other element through which the bolt extends. In the particular construction of washer shown in the present instance the base piece 10 is somewhat elongated and its bottom face 14 is substantially flat so as to seat firmly on the timber, truss, or other member. Centrally of the base piece is the opening through which the bolt extends and at the ends of said opening there are walls 15, 16 which act as stops which limit the angular disposition of the base piece with respect to the bolt. As shown, one end wall 15 will be perpendicular to the bottom face 14 while the other end wall 16 may be arranged at an acute angle. The side walls 17 of the base piece have their edges remote from bottom face 14 struck on an arc about the center C, these curved edges serving as ways or guides on which the seating member 11 may slide or be adjusted, said seating member having an arcuate bottom face being provided at two of its opposite edges with depending portions 18 which serve to prevent its movement laterally of the base piece.

To facilitate securing the several parts in place with respect to the bolt the base piece 10 is formed with flange 19 which, in turn, is provided with means for receiving temporary fastening elements with which the base piece may be secured in place on the timber with its opening in registry with the hole through which the bolt is to be projected. For receiving such fastening means, the flange 19 is recessed, such recesses 20 being preferably formed simply in edge portions as distinguished from being formed interiorly of the flange. The provision of the flanges 19 at the sides of the base piece also permits the side walls of the base piece to be strengthened by the use of reinforcing webs 21. In addition to these fastening elements, the base piece is also provided with means, engageable with one of the timbers or other members to be connected by the bolt, for preventing axial strains being imposed on the bolt or rod during installation. These means may consist of a lug 22 formed in the present instance at one end of the bottom surface of the base piece. By setting said lug 22 in the timber or other member to be connected, the base piece will be securely held against slipping. In the absence of this lug it has been found that when all the parts have been assembled and the nut is drawn up, the washer has a tendency to slip until the rod is brought in bearing against the timber or member through which it extends, resulting in axial strains on the rod. The provision of lug 22, however, prevents this by holding the base against slipping at all times.

With a washer thus formed the base piece 10 may be temporarily secured in place around the hole in the timber through which the bolt 13 is to extend and after the bolt 13 has been inserted through said timber and the base piece the seating member 11 for the bolt and the nut is then placed on the bolt and the nut 12 finally tightened against said base piece. As shown diagrammatically in Fig. 1, by having the seating member supporting walls 17 of the base struck on an arc about the center C, loads will be uniformly or symmetrically imposed upon the base piece. This is quite advantageous because in building construction where bevel washers are used, the angle at which the washer is disposed with respect to the bolt varies a great deal, but, in the present instance, regardless of this variance of angles, the load will always be imposed centrally of the base piece. The construction of the washer is also such that it may be disposed at numerous angles with respect to the bolt and by making the washers in three or four sizes, practically all sizes of washers and bolts commonly used can be taken care of.

This application is a continuation of applicant's pending application Serial No. 180,223 insofar as any subject matter common to the two cases is concerned.

What I claim is:

1. A washer of the kind described comprising a flat member seatable against a flat surface and having a slot for a bolt or rod and outstanding integral curved portions at opposite sides of said slot, and a washer plate having an aperture for said bolt or rod and adapted to seat against said curved portions, said member having an abutment adjacent to one end of said slot to enter a slot in an object and abut against said object.

2. An adjustable angle washer for disposition between the bearing surface of one of two members to be connected and the headed end of a tensioned tie rod extending through said members, said washer comprising a base plate having a bearing surface adapted to be disposed upon the bearing surface of one of said members to be connected, said base plate having a slot through which the tensioned rod is to be extended, outwardly extending walls on said base plate at opposite sides of said slot, each of said walls having arcuate peripheral bearing surfaces struck on different radii but on the same center providing a step-cut way, the centers of the arcs of said walls being on a line extending through the point of intersection of the bearing surface of said plate and the longitudinal axis of the rod in all positions of the rod, a washer having an aperture through which the tensioned tie rod is to be extended, an outer surface upon which the head of said rod is to bear, and step-cut arcuate inner surfaces providing uniform slidable bearing upon the arcuate surfaces of said outwardly extending walls, and means attached to said base plate for preventing lateral movement of said plate upon the surface of said member to be connected with which said plate is associated.

3. A washer of the kind described comprising a member seatable against a surface and having a slot for a bolt or rod, said slot being formed intermediate the ends of said member and said member being adapted to take a bearing against said surface at opposite ends of said slot and outstanding integral convex curved portions at opposite sides of said slot, and a washer plate having an aperture for said bolt or rod and adapted to seat against said curved portions, said member having an abutment adjacent to one end of said slot to enter a slot in an object and abut against said object.

4. An adjustable angle washer for disposition between the bearing surface of one of two members to be connected together and an enlargement on a tensioned tie rod extending through said members, said washers comprising a base plate having a slot through which the rod is to be extended, said base plate being seatable at opposite ends of said slot upon the bearing surface of said member, and outwardly projecting walls on said base plate at opposite sides of said slot, which walls have convex peripheral bearing surfaces, the centers of the arcs of which are on a line extending through the point of intersection of the plane of said bearing surfaces of said plate and the longitudinal axis of said rod in all positions of said rod, the enlargement on said rod having a sliding engagement on said arcuate peripheries of said walls.

GROVER C. ROYSE.